Aug. 5, 1969 V. R. SAARI 3,459,963
BISTABLE DIFFERENTIAL CIRCUIT
Filed March 25, 1966
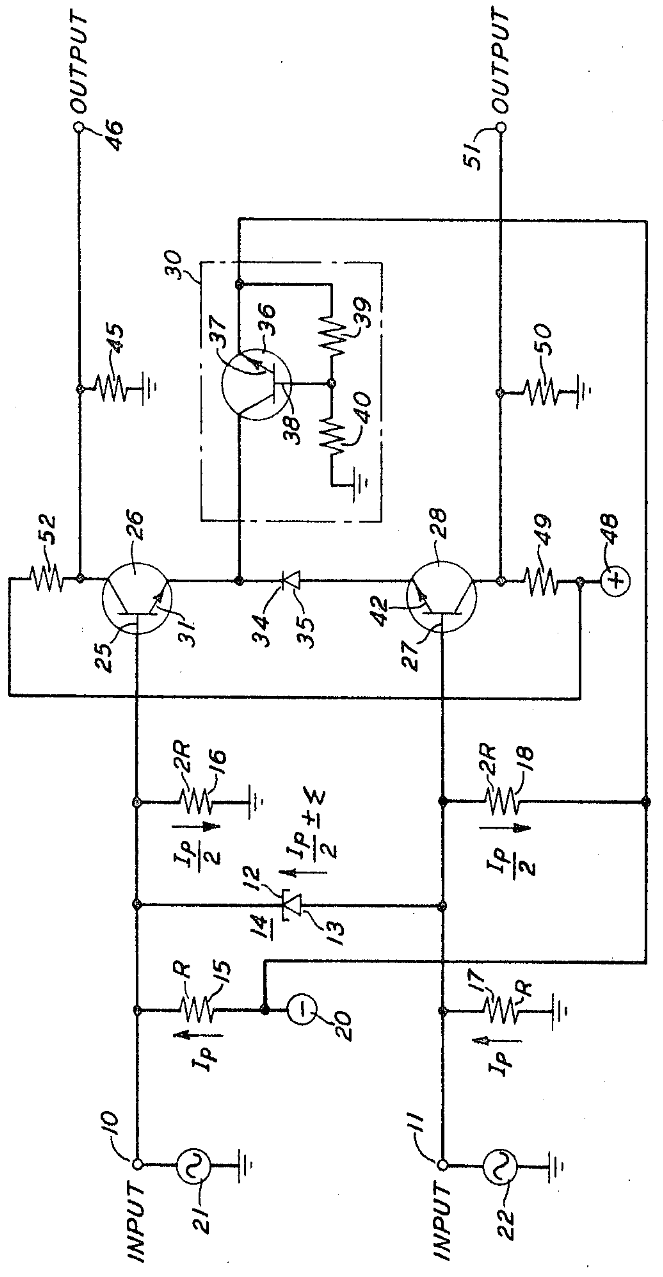
INVENTOR
V. R. SAARI
BY Leonard M. Arnold
ATTORNEY United States Patent Office 3,459,963
Patented Aug. 5, 1969

3,459,963

BISTABLE DIFFERENTIAL CIRCUIT

Veikko R. Saari, Old Bridge, N.J., assignor to Bell Telephone Laboratories, Incorporated, New York, N.Y., a corporation of New York Filed Mar. 25, 1966, Ser. No. 537,404
Int. Cl. H03k 5/20
U.S. Cl. 307—235 1 Claim This invention relates to differential bistable circuits for producing binary output signals in response to the difference between two input currents.

A differential bistable circuit has two input terminals and produces output signals which are a function of the difference in amplitude between the currents applied to the input terminals. More particularly, such a circuit has two stable states which represent the binary digits "1" and "0," respectively. Such circuits are commonly used as the sense amplifier in the memory circuits of high speed digital computers and are now finding use in the threshold circuits of high speed analog-to-digital encoders. Because of the increasing speed and precision of operation of both computers and encoders increased demands have been placed on differential bistable circuits which demands cannot in many instances be satisfied by the circuits employed in the prior art.

It is an object of this invention therefore to increase the speed and precision of operation of differential bistable circuits.

In accordance with this invention two transistors are emitter-coupled by a direct current bias source, which may be a battery, a resistor, or a conventional diode, and base-coupled by a tunnel diode connected in a biasing network to form a differential bistable circuit. A representative portion of any signal current driven into either node terminating the tunnel diode flows through the tunnel diode with the other half going to ground. Two state output signals are produced at the collector electrodes of the transistors in response to the state of the tunnel diode which in turn depends on the difference in input currents. Because the tunnel diode drives the transistors substantial currents can be switched at high speeds. In addition, the circuit can be easily tailored to match the peak-to-valley voltage of the particular tunnel diode employed by adjusting the bias voltage applied between the emitters of the transistors. Finally, there is little disturbance of other circuitry because any current driven to ground by one of the transistors is taken from ground by the other transistor. Thus, even in the presence of ground inductances there is little coupling to other circuitry and interference is minimized. These advantages over the circuits employed in the prior art are heightened by employing a current regulator circuit to supply current to the emitters of the transistors of the differential stage.

This invention will be more fully comprehended from the following detailed description taken in conjunction with the drawing which is a schematic diagram of a differential bistable circuit embodying this invention.

There are provided two input terminals 10 and 11 connected respectively to the cathode 12 and anode 13 of a tunnel diode 14 which has a peak current $I_p$. These input terminals are connected to sources 21 and 22. Resistors 15, 16, 17 and 18 form a voltage dividing network to provide a biasing voltage from source 20 to maintain a bias current of nominal value $I_p/2$ through the tunnel diode but such current may be considered of exact value $I_p/2 \pm \epsilon$, depending upon the varying state of the tunnel diode 14 ($\epsilon \ll I_p/2$).

The presence of the resistors 15, 16, 17 and 18 causes the currents from sources 21 and 22 to be divided and only approximately one-half of any injected current flows through the tunnel diode 14.

Initially the tunnel diode may be in either its low or high voltage state and in either condition a current of value $I_p/2 \pm \epsilon$ flows through the tunnel diode. If the tunnel diode is in its high voltage state, then the base electrode 25 of transistor 26 which is connected to the cathode 12 of tunnel diode 14 is at a small negative voltage with respect to the base electrode 27 of transistor 28 which is connected to the anode 13 of tunnel diode 14. If the tunnel diode 14 is in its low voltage state then the base electrodes 25 and 27 are at approximately the same potential.

Whenever the relative values of the voltages of sources 21 and 22 are such that an input current greater than $I_p$ units of current is injected into input terminal 10, the tunnel diode 14, if in its high voltage state, is driven into its low voltage state. If the tunnel diode 14 was in the low voltage state it remains in that condition. This operation results from the fact that the voltage across the tunnel diode is very small when compared with the voltage between each input terminal 10, 11 and ground so that essentially half the current injected at input terminal 10 passes through the tunnel diode 14. In the high voltage state the current through the tunnel diode is approximately equal to $I_p/2$ and as a result of the injection of an input current of approximate value $I_p$ at terminal 10 a current $I_p/2$ is forced to flow through the tunnel diode from cathode to anode to switch the tunnel diode to its low voltage state.

Similarly, if the tunnel diode is initially in its low voltage state and the relative values of the voltages of sources 21 and 22 is such that an input current greater than $I_p$ units of current is injected into input terminal 11, then half this injected current flows through the tunnel diode 14 from anode to cathode causing it to assume its high voltage state. Thus, the relative voltage at the base electrodes 25, 27 of the two transistors 26, 28 is determined by the state of the tunnel diode 14 and this in turn is determined by the difference in input currents.

The emitter current of each transistor 26, 28 is obtained from source 20 which is connected by means of current regulator circuit 30 to the emitter electrode 31 of transistor 26 and to the cathode 34 of a conventional diode 35. The current regulator may be any one of a number konwn to those skilled in the art, the illustrative one shown in the drawing comprising a single transistor 36 having its emitter electrode 37 connected to source 20, and its base electrode 38 connected to both source 20 and ground by means of resistors 39 and 40, respectively.

When the tunnel diode 14 is in its low voltage state and the voltages at the base electrodes 25 and 27 of transistors 26 and 28 are approximately equal, transistor 26 is conducting strongly but transistor 28 is only slightly conducting. This operation is due to the voltage drop across the conventional diode 35, acting as a bias source, which is connected between the emitters 31 and 42 of transistors 26 and 28, respectively, and which reduces the base emitter voltage of transistor 28. The ratio of the emitter currents in transistors 26 an 28 is a strong function of the difference between the respective base-to-emitter voltage drops. Furthermore, the current regulator 30 insures that at any instant at least one of the emitters 31 and 42 is conducting substantially. Therefore, when the base electrodes are at nearly the same potential, most of the current drawn by regulator 30 flows through transistor 26. Transistor 28 conduct only lightly because the relatively small current which flows in diode 35 in this condition suffices to produce a voltage drop therein which ensures that the forward emitter-junction potential of transistor 26 exceeds that of transistor 28 by an amount sufficient to ensure a large ratio between the respective emitter currents. Transistor 26 is therefore able to conduct when the tunnel diode 14 is in its low voltage state so that current flows from source 20 through the current regulator circuit 30 through transistor 26 to the load resistor 45 connected between output terminal 46 and ground. As a result a negative output voltage appears at output terminal 46. Since transistor 28 is not conducting substantially, current flows from positive voltage source 48 through the collector resistor 49 of transistor 28 to the load resistor 50 connected between output terminal 51 and ground and a positive voltage of a predetermined magnitude appears at output terminal 51.

When the tunnel diode 14 is in the high voltage state the base electrode 25 of transistor 26 is negative with respect to the voltage at the base electrode of transistor 28 by an amount exceeding the voltage drop across diode 35 and transistor 26 is not conducting substantially while transistor 28 is conducting. As a result current flows from source 48 through the collector resistor 52 of transistor 26 and through the load resistor 45 connected between output terminal 46 and ground. This current flow results in a positive voltage at output terminal 46. Current also flows from negative source 20 through the current regulator circuit 30 through transistor 28 to the load resistor 50 connected between output terminal 51 and ground so that a negative voltage of a predetermined magnitude is present at output terminal 51.

Thus, in accordance with this invention two state output signals are produced at the collector electrodes of the transistors in response to the state of a tunnel diode which in turn depends on the difference in input currents. Substantial input currents may be switched at high speeds and by merely adjusting the voltage applied between the emitters of the two transistors the circuit can be adjusted to match the peak-to-valley voltage of the particular tunnel diode employed. In addition, the apparatus does not interfere with other apparatus having the same ground structure because any current driven to ground through one of the load resistors 45 and 50 is removed from ground by the other. Thus, even if there is some inductance associated with the ground structure, there will be no substantial ground voltages generated by a differential bistable circuit embodying this invention to interfere with other apparatus having the same ground structure.

It is to be understood that the above described arrangements are merely illustrative of the application of the principles of the invention. Numerous other arrangements may be devised by those skilled in the art without departing from the spirit and scope of the invention.

What is claimed is:

1. A differential bistable circuit comprising, in combination, a tunnel diode having an anode and a cathode, a biasing network connected to said anode and cathode of said tunnel to maintain a predetermined current flow in said tunnel diode, two current input terminals a first connected to the cathode of said tunnel diode and the second connected to the anode of said tunnel diode, a difference circuit comprising two transistors each transistor having base, emitter and collector electrodes, a PN diode connecting the emitter electrodes of said transistors, means connecting the base electrode of a first and said transistors to the anode of said tunnel diode, means connecting the base electrode of the second of said transistors to the cathode of said tunnel diode, a source of collector-emitter bias voltage connected to said collector electrodes of said transistors, a source of voltage connected to said emitter electrode of said second transistor and said cathode of said PN diode so that said first transistor is conducting when said tunnel diode is in its low voltage state and said second transistor is conducting when said tunnel diode is in its high voltage state.

References Cited

UNITED STATES PATENTS

| | | | |
|---|---|---|---|
| 3,102,209 | 8/1963 | Pressman | 307—286 |
| 3,176,152 | 3/1965 | Spiegel | 307—322 |
| 3,328,599 | 6/1967 | Stupar | 307—235 |
| 3,239,695 | 3/1966 | Neff et al. | 307—286 |
| 3,385,979 | 5/1968 | Cho | 307—322 |

OTHER REFERENCES

RCA Technical Note, TN NO.: 543, March 1962, "Two-State Circuit Employing Tunnel Diodes and Transistors."

ARTHUR GAUSS, Primary Examiner

H. A. DIXON, Assistant Examiner

U.S. Cl. X.R.

307—286, 322; 330—30